US006916041B2

(12) United States Patent
Karray et al.

(10) Patent No.: US 6,916,041 B2
(45) Date of Patent: Jul. 12, 2005

(54) MULTI-DEPLOYMENT AIRBAG INFLATOR

(75) Inventors: Fakhri Karray, Waterloo (CA); Otman Basir, Waterloo (CA); Viktor Haramina, Kitchener (CA)

(73) Assignee: Intelligent Mechatronic Systems, Inc. (CA)

( * ) Notice: Subject to any disclaimer, the term of this patent is extended or adjusted under 35 U.S.C. 154(b) by 0 days.

(21) Appl. No.: 10/380,741

(22) PCT Filed: Sep. 19, 2001

(86) PCT No.: PCT/IB01/01723

§ 371 (c)(1), (2), (4) Date: Oct. 14, 2003

(87) PCT Pub. No.: WO02/24492

PCT Pub. Date: Mar. 28, 2002

(65) Prior Publication Data

US 2004/0051288 A1 Mar. 18, 2004

Related U.S. Application Data

(60) Provisional application No. 60/233,743, filed on Sep. 19, 2000.

(51) Int. Cl.[7] ................................................ B60R 21/26

(52) U.S. Cl. ........................................................ 280/736

(58) Field of Search ................................ 280/736, 737, 280/740, 741, 742

(56) References Cited

U.S. PATENT DOCUMENTS 5,368,329 A * 11/1994 Hock ......................... 280/741
5,564,743 A * 10/1996 Marchant .................... 280/741
5,803,494 A 9/1998 Headley
5,992,881 A 11/1999 Faigle
6,019,389 A 2/2000 Burgi et al.
6,547,277 B1 * 4/2003 Adamini et al. ............ 280/741

FOREIGN PATENT DOCUMENTS

EP 0733519 9/1996
JP 07215164 A * 8/1995 ........... B60R/21/26

* cited by examiner

*Primary Examiner*—Faye M. Fleming
(74) *Attorney, Agent, or Firm*—Carlson, Gaskey & Olds

(57) ABSTRACT

An inflator assembly for an airbag includes a container with a plurality of exhaust ports positioned about a perimeter. A rupturable, non-combustible material covers the perimeter of the container to cover the exhaust ports. A plurality of perforated and rupturable walls define a plurality of chambers concentrically disposed within the container. Within each of the plurality of chambers is a detonator to trigger a gas-producing chemical to inflate an airbag cushion. The detonators disposed in each of the individual chambers can be detonated separately from other detonators in other chambers.

19 Claims, 1 Drawing Sheet

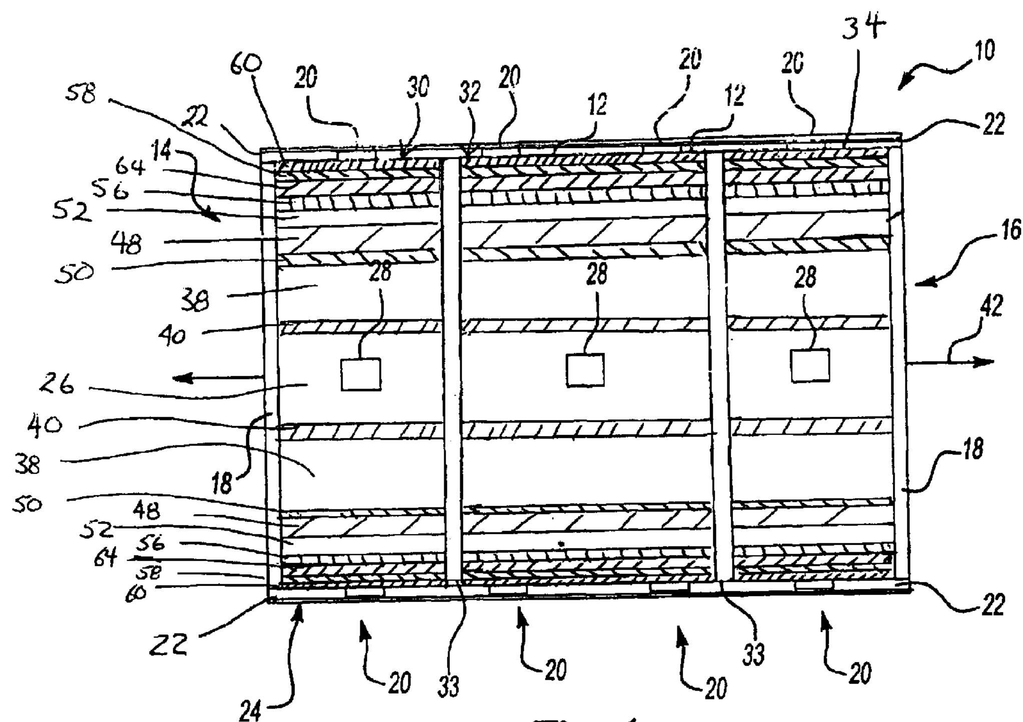
Fig-1
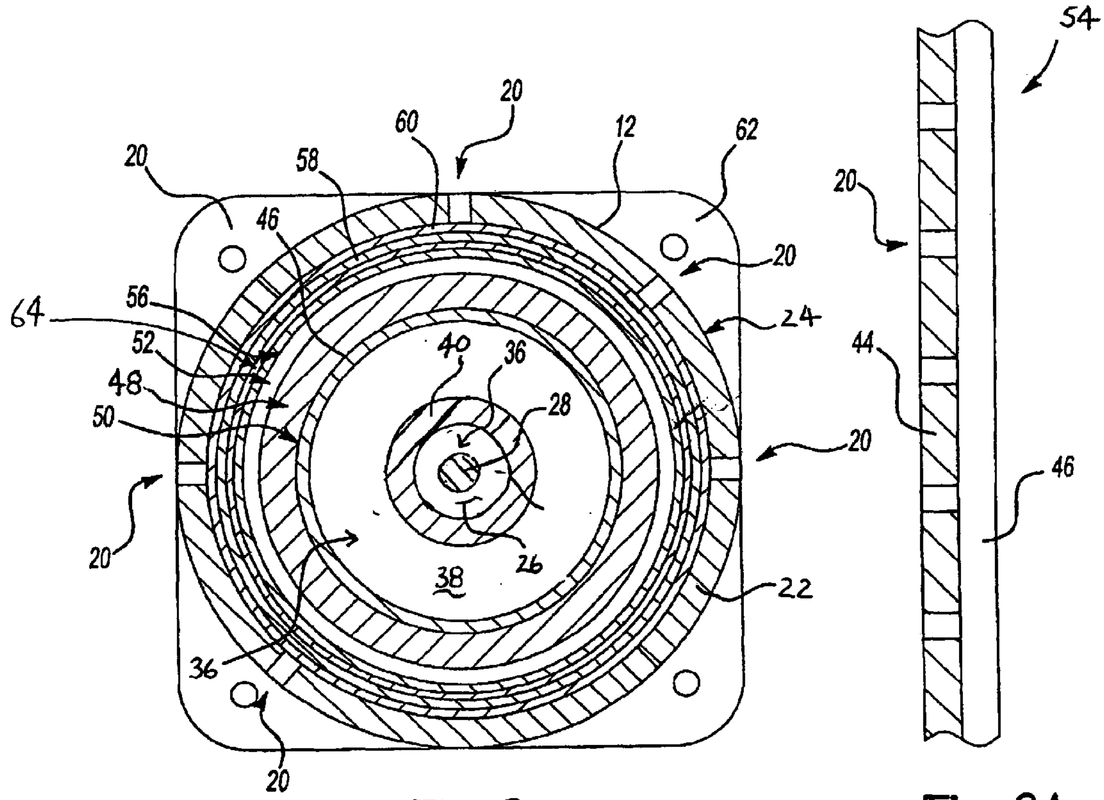
Fig-2
Fig-2A

MULTI-DEPLOYMENT AIRBAG INFLATOR

This application is a 371 of PCT/IO01/01723 Sep. 19, 2001 which claims benefit of provisional 60/233,743 Sep. 19, 2000.

BACKGROUND OF THE INVENTION

This invention relates to an airbag assembly for a motor vehicle and specifically to an airbag inflator assembly with multiple chambers and detonators. Typically, an airbag assembly includes an airbag cushion and an inflator assembly. Conventional inflator assemblies include a detonator to trigger a gas-producing chemical. Triggering the gas-producing chemical produces a large quantity of rapidly expanding gas that inflates the airbag cushion. The inflator is typically triggered electrically by way of an electronic control module positioned within a motor vehicle. The rapidly expanding gas that inflates the airbag cushion exerts a large force in a relatively short duration of time. This large force is a product of the speed in which an airbag must fully inflate in order to provide impact prevention to occupants of the vehicle during a collision.

The force of inflation is set at a level such that an occupant of normal size and weight will not be injured. The force of inflation of an airbag cushion required varies depending on the specific size and weight of the occupant. Injury to smaller occupants, such as children is a design consideration taken into account when determining the magnitude of airbag inflation. As appreciated, the large forces exerted by an inflating airbag can cause injury to the occupants they are designed to protect.

For this reason, warnings and devices are currently in uses that simply turn the air bag off upon the sensing of specific conditions. In some instances a simply switch is installed to turn off the airbag. Other devices sense the size or weight of the occupant and activate the airbag only under a predefined set of conditions. It is well proven that airbag cushions provide an additional level of safety to an occupant during a collision. Devices that disable the airbag remove this level of safety to the detriment of smaller occupants.

For this reason, it is desirable to develop an airbag assembly that can inflate at various force levels such that the safety benefits of an airbag cushion can be used for occupants of all sizes.

SUMMARY OF THE INVENTION

An embodiment disclosed in this application is an airbag inflator assembly including multiple chambers each containing separate individually triggerable detonators to control inflation of an airbag cushion.

The inflator assembly includes a container with a plurality of exhaust ports disposed about a perimeter and covered by a rupturable, non-combustible material. The container is cylindrically shaped and includes a plurality of chambers disposed about a common axis. Each chamber is defined and separated from the other chambers by a wall. Surrounding each chamber are modular walls that comprise a structural layer having a plurality of perforations and a non-combustible layer covering the perforations to contain a gas-producing chemical. Each of the chambers includes a detonator for triggering the gas-producing chemical. Each detonator can be triggered separate from any of the others such that the amount of gas discharged to inflate the airbag cushion can be varied and controlled. All detonators can be triggered at once, individually, sequentially or in any other predetermined manner to initiate gas production from specific chambers.

The disclosed airbag inflator assembly includes multiple chambers, each including an individually triggerable detonator that provides control over the inflation of the airbag cushion to vary the magnitude of force exerted by the airbag cushion during inflation.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 1 is a cross-sectional view of the air bag inflator;

FIG. 2 is a cross-sectional view of one chamber of the airbag inflator; and

FIG. 2A is an enlarged view of construction of a modular wall.

DETAILED DESCRIPTION OF THE PREFERRED EMBODIMENT

Referring to the Figures, wherein like numerals indicate like or corresponding parts throughout the several views, an inflator assembly for an airbag system is generally indicated at 10 in FIG. 1. The inflator assembly 10 includes a cylindrical container 12 extending between first and second axial ends 14,16. First and second end caps 18 disposed at each of the axial ends 14,16 seal the cylindrical container 12. The container includes inflator chambers 30,32, and 34 disposed along the axis 42 and defined by divider walls 33. The divider walls 33 are not rupturable and isolate the inflator chambers 30,32 and 34 from each other.

Referring to FIG. 2, a cross-section of one chamber is shown and includes a plurality of exhaust ports 20 disposed within an outer wall 22. The exhaust ports are disposed about a perimeter 24 of the cylinder 12 to allow flow of inflating gas emanating from the multiple chambers 30,32 and 34. The total area of all exhaust ports 20 comprises at least a minimum flow area for proper gas exhaustion. Further, the number of exhaust ports 20 disposed about the perimeter 24 of the container 12 is of sufficient number to properly vent gas. A worker knowledgeable in the art would understand that the size and number of exhaust ports 20 are dependent on the specific application.

Referring to FIG. 2A, a cross-sectional view of a modular wall structure 54 is shown. The outer wall 22 along with other walls described hereafter within the inflator assembly 10 are constructed with according to the modular wall structure indicated at 54. The modular wall structure indicated at 54 includes a a rupturable, non-combustible material 46 supported by a structural layer 44. The structural layer 44 includes the exhaust ports 20. The structure of the modular wall indicated at 54 is used for various walls of this inventive inflator assembly 10. The rupturable, non-combustible material 46 contains a gas-producing chemical within the container 12 until activation. During activation of the gas-producing chemical, the rupturable, non-combustible material 46 blows out to allow gas to flow from the container 12 outwardly to inflate an airbag cushion (not shown).

Referring back to FIG. 1, within the container 12 the divider-walls 33 defining the chambers 30,32, and 34. Each of the chambers 30,32, and 34 contains a quantity of gas producing chemical 36 and a detonator 28.

The detonator 28 in each chamber 30,32, and 34 is preferably triggered by an electric signal initiated from the motor vehicle. Because each chamber 30,32, and 34 includes a detonator 28, each chamber 30,32, and 34 can detonate independent of any of the other chambers 30,32, and 34. In this manner, inflation of the airbag cushion (not shown) can be initiated by triggering the chambers 30,32, and 34 simultaneously, sequentially or individually to control inflation of the airbag cushion.

Referring to FIG. 2A, the modular wall structure 54 comprises the structural layer 44 supporting the rupturable non-combustible layer 46. The rupturable, non-combustible layer 46 is substantially heat resistance to withstand any heat generated from triggering of the gas-producing chemical.

Referring again to FIG. 2, each chamber includes a centrally located detonation chamber 26. A detonator 28 is disposed within each of the detonation chambers 26. A detonation chamber wall 40 defines the detonation chamber 26 and is a modularly constructed wall including the structural layer 44 and the rupturable layer 46 described and best shown in FIG. 2A. Disposed about the detonation chamber 26 is a chemical chamber 38 filled with the gas producing chemical 26. Disposed about the chemical chamber 38 is a layer of coarse wire gauze 50. The wire gauze layer 50 is disposed on an inner surface of gas chamber wall 48. The gas chamber wall 48 defines the chemical chamber 38 and is of modular construction including the structural layer 44 and rupturable layer 46. The specific configuration of the wire gauze layer 50 is known by those knowledgeable in the art.

To the outside of the gas chamber wall 48 is a concentric space 52 that does not contain gas producing chemical 36. Disposed about the concentric space is an intermediate wall 64 constructed according to the modular constructed wall. The intermediate wall 64 includes the structural layer 44 and the non-combustible material 46. To the outside of the intermediate wall 64 is a layer of insulation 56. The intermediate wall 64 is covered with a layer of course wire gauze 58. A fine wire gauze 60 covers the course wire gauze 58. And the outer wall 22 is disposed about the fine wire gauze 60. A substantially square shaped bracket 60 surrounds the container 12 to facilitate mounting of the inflator 10 within an airbag assembly.

In operation, the inflator assembly 10 responds to a controller (not shown) that is in communication with each of the detonators 28. Upon detection of a condition requiring air bag inflation, the controller signals for the detonation of at least one of the detonators 28. Because each of the detonators 28 are isolated within separate chambers 30, 32, and 34, activation of one detonator 28 does not cause detonation of the other detonators. Each chamber 30, 32, and 34 may be actuated separately, sequentially or concurrently. The flexibility of separate detonator 28 actuation provides for the control of air bag inflation force by actuating only the specific amount of gas producing chemical desired according to a specific application of condition.

The foregoing description is exemplary and not just a material specification. The invention has been described in an illustrative manner, and should be understood that the terminology used is intended to be in the nature of words of description rather than of limitation. Many modifications and variations of the present invention are possible in light of the above teachings. The preferred embodiments of this invention have been disclosed, however, one of ordinary skill in the art would recognize that certain modifications are within the scope of this invention. It is understood that within the scope of the appended claims, the invention may be practiced otherwise than as specifically described. For that reason the following claims should be studied to determine the true scope and content of this invention.

What is claimed is:

1. An inflator assembly for an airbag comprising;

a container including a plurality of exhaust ports;

a rupturable, non-combustible material covering said exhaust ports;

a plurality of chambers defined within said container;

a gas-producing chemical disposed within each of said chambers;

a detonator disposed in each of said chambers for triggering said gas producing chemical, wherein each of said detonators triggers only said gas producing chemical within said chamber within which said detonator is disposed such that a desired amount of gas for inflating the airbag is varied by triggering detonators from one or more of said plurality of chambers.

2. The assembly of claim 1, wherein said container is cylindrical and includes end caps to seal ends of said cylindrical container.

3. The assembly of claim 1, wherein each of said compartments within said container are disposed adjacent one another along a common axis.

4. The assembly of claim 3, wherein said exhaust ports are disposed about a perimeter of said container.

5. The assembly of claim 1, wherein each of said compartments includes a plurality of exhaust ports within a perforated and rupturable wall.

6. The assembly of claim 5, wherein said perforated and rupturable walls are multi-layered.

7. The assembly of claim 6, wherein said multi-layered perforated and rupturable walls include a structural layer and a substantially non-combustible layer.

8. The assembly of claim 1, wherein said plurality of exhaust ports comprise a total flow area for gas exiting said container, said total flow area is of a minimum desired orifice size.

9. The assembly of claim 1, wherein said plurality of exhaust ports comprise a total flow area, and said plurality of exhaust ports comprise a total number of exhaust ports combining to exhaust a desired amount of gas produced from said gas producing chemical.

10. The assembly of claim 1, wherein an electrical signal triggers said detonators.

11. The assembly of claim 1, wherein said detonators are isolated from each other within separate chambers such that detonation of any one detonator in one chamber does not cause detonation of any other detonator within any other chamber.

12. The assembly of claim 1, wherein said assembly is mounted within an external bracket for mounting.

13. The assembly of claim 3, further comprising non-rupturable continuously solid divider walls defining said chambers within said container, said divider walls disposed transverse to said common axis.

14. An inflator assembly for an airbag comprising:

a container including a plurality of exhaust ports;

a rupturable material covering said exhaust ports;

a plurality of chambers defined by a corresponding plurality of non-rupturable walls, wherein each of said chambers is filled with a gas-producing chemical; and a detonator disposed in each of said plurality of chambers for triggering said gas producing chemical.

15. The assembly as recited in claim 14, wherein each of said detonators triggers only said gas producing chemical within each of said plurality of chambers within which said detonator is disposed.

16. The assembly as recited in claim 13, wherein a desired amount of gas for inflating an airbag is varied by selectively actuating one or more of said plurality or detonators.

17. The assembly as recited in claim 14, wherein each of said plurality of chambers is isolated from each other such that ignition of a detonator in any one of said plurality of chambers does not trigger said gas producing chemical in any other of said plurality of chambers.

18. The assembly as recited in claim 14, wherein said detonators are isolated from each other within separate chambers such that detonation of any one detonator in any one chamber does not cause detonation of any other detonator in any other chamber.

19. The assembly as recited in claim 14, wherein said chambers are isolated from each other such that detonation of any of said detonators does not cause detonation of gas-producing chemical in any other chamber.

* * * * *